United States Patent
Tamura et al.

[15] 3,639,203
[45] Feb. 1, 1972

[54] HIGHLY CRIMPABLE POLYAMIDE COMPOSITE FILAMENTS

[72] Inventors: Yoshio Tamura; Satoshi Ando, both of Osaka, Japan

[73] Assignees: Kanegafuchi Boseki Kabushiki Kaisha, Tokyo, Japan; Snia Viscosa Societa Nazionale Industria Applicacioni Viscosa S.p.A., Milan, Italy

[22] Filed: July 23, 1970

[21] Appl. No.: 57,770

Related U.S. Application Data

[63] Continuation-in-part of Ser. No. 671,217, Sept. 28, 1967, Pat. No. 3,551,227.

[30] Foreign Application Priority Data

Oct. 10, 1966 Japan.....................................41/66548

[52] U.S. Cl...............................161/173, 161/175, 161/177
[51] Int. Cl..........................................................D02g 3/02
[58] Field of Search...............................161/173, 175, 177; 264/DIG. 26, 171; 260/78

[56] References Cited

UNITED STATES PATENTS

| | | | |
|---|---|---|---|
| 3,397,107 | 8/1968 | Kimura | 161/173 |
| 3,458,390 | 7/1969 | Ando et al. | 161/173 |
| 3,463,847 | 8/1969 | Ueda et al. | 161/173 |
| 3,515,703 | 6/1970 | Ueda et al. | 161/173 |

*Primary Examiner*—Robert F. Burnett
*Assistant Examiner*—Linda C. Koeckert
*Attorney*—Stevens, Davis, Miller & Mosher

[57] ABSTRACT

Production of polyamide composite filament having high crimpability, one component of which is polycapramide and the other component of which is a copolyamide consisting of 0.01 to 5 percent by weight of nylon salt composed of a dicarboxylic acid and a polyfunctional diamine having the general formula

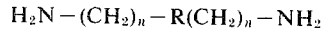

$$H_2N-(CH_2)_n-R(CH_2)_n-NH_2$$

wherein R is $>CHC\ell$ or $>CHBr$ and n is 3 to 11, 3 to 20% by weight of another nylon salt and 75 to 95% by weight of polycapramide forming components.

13 Claims, No Drawings

HIGHLY CRIMPABLE POLYAMIDE COMPOSITE FILAMENTS

This application is a continuation-in-part of our copending application, Ser. No. 671,217, filed Sept. 28, 1967, now U.S. Pat. No. 3,551,277.

The present invention relates to a process of producing polyamide composite filaments having excellent crimpability, dyeability and physical properties in which two different thermoplastic linear synthetic polymers having fiber-forming abilities are conjugate spun simultaneously through a common orifice.

There have been hitherto proposed various methods for production of composite filament having latent crimpability It has been known that a composite filament having an improved crimpability can be obtained when polymers having physical and chemical properties different as possible are used as the components of the composite filament. However, the composing components having considerably different chemical structures and properties are poor in mutual adhesive property and both components are liable to cause separation, so that these components have a drawback, wherein a satisfactory composite filament can hardly be obtained. Therefore, in order to increase the mutual adhesive property of polycondensates to be bonded, a method in which a homopolyamide is combined with a copolyamide has been adopted, while in this method the polymers are comparatively similar in chemical and physical properties, so that the formed composite filament is not always satisfied in crimpability.

If the polycondensation ratio is increased, the dyeability of the copolyamide can be considerably improved as compared with that of the homopolyamide, but, in general, strength, elongation, Young's modulus, melting point, etc., lower, so that either the dyeability or physical properties of filament must be sacrificed at present.

The inventors have found that the difference of shrinking percentages of both components and the physical properties of each component constituting such a composite filament influence the crimpability which develops in the aftertreatment such as heating or swelling step, and further that formation of moderate cross-linkage or branch is remarkably effective in order to improve the physical properties, particularly the elastic properties, and have investigated systematically the relation of the differences of shrinking percentages, physical properties, dyeabilities, etc., with respect to copolyamides obtained by copolycondensation of a homopolyamide with various polyfunctional compounds (compounds having functional groups other than the functional group taking part in the formation of polyamides) and as the results the present invention has been achieved.

The object of the present invention is to provide a polyamide composite filament having an improved adhesive property, a remarkably high crimpability and further having more excellent dyeability and physical properties than those of the filament composed of one-component polyamide.

The present invention consists in a process of producing composite filaments having an improved crimpability, in which two different fiber-forming thermoplastic synthetic linear polymers and melted separately and then extruded simultaneously through a common orifice to form a unitary filament, wherein these two polymers are eccentrically arranged and bonded as distinct filamentary components along the length of the filament, characterized in that one of said components is polycapramide and the other of said components is a copolyamide obtained by copolycondensing 0.01-5 percent by weight of nylon salt consisting of a dicarboxylic acid and a polyfunctional diamine having the following general formula:

$$H_2N-(CH_2)_n-R-(CH_2)_n-NH_2,$$

wherein R represents $>C=O$, $>CHOH$, $>CHCl$ or $>CHBr$ and $n$ is 3–11, 3–20 percent by weight of another nylon salt and 75–95 percent by weight of polycapramide forming components.

That is to say, considering the fact that the difference in crystallinity or orientation degree of both polycondensates to be bonded influences highly the difference in shrinking percentages and dyeability, and that cross-linkage or branch influences elastic properties, the inventors have succeeded to achieve the object of the present invention by using, as a copolyamide to be bonded with a homopolyamide (polycapramide), a copolyamide obtained by copolycondensation of a polycapramide forming component having an excellent adhesive property to said homopolyamide, publicly known nylon salt having a property to disturb crystallinity and further a small amount of nylon salt containing diamine having the above-mentioned general formula and capable of forming moderate branch or cross-linkage in order to improve the elastic properties.

The nylon salts to be used in the invention of diamines having the following general formula

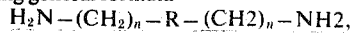

wherein R represents $>C=O$, $>CHOH$, $>CHCl$ or $>CHBr$ and $n$ is 3–11, with dicarboxylic acids include nylon salts of the diamines having the above-mentioned general formula with publicly known dicarboxylic acids.

As the diamines having the above-mentioned general formula, for example, mention may be made of 1,7-diamino-4-heptanol, 1,9-diamino-5-nonanol, 1,11-diamino-6-undecanol, 1,13-diamino-7tridecanol, 1,15-diamino-8-pentadecanol, 1,17-diamino-9-heptadecanol, 1,19-diamino-10-nonadecanol, 1,21-diamino-11-heneicosanol, 1,23-diamino-12-tricosanol, 1,7-diamino-4-chloroheptane, 1,9-diamino-5-chlorononane, 1,11-diamino-6-chloroundecane, 1,13-diamino-7-chlorotridecane, 1,15-diamino-8-chloropentadecane, 1,17-diamino-9-chloroheptadecane, 1,19-diamino-10-chlorononadecane, 1,21-diamino-11-heneicosane, 1,23-diamino-12-chlorotricosanone, 1,11-diamino-6-bromoundecane, 1,13-diamino-7-bromotridecane, 1,7-diamino-4-heptanone, 1,9-diamino-5-nonanone, 1,11-diamino-6-undecanone, 1,13-diamino-7-tridecanone, 1,15-diamino-8-pentadecanone, 1,17-diamino-9-heptadecanone, 1,19-diamino-10-nonadecanone, 1,21-diamino-11-heneicosanone, 1,23-diamino-12-tricosanone, etc.

These diamines can be easily prepared by hydrogenation or halogenation of Schiff bases obtained by dimerizing lactams or ω-aminocarboxylic acids through decarbonation.

As dicarboxylic acids which can form nylon salts with the diamines having the above-mentioned general formula, for example, mention may be made of glutaric acid, adipic acid, pimelic acid, suberic acid, azelaic acid, sebacic acid, terephthalic acid, isophthalic acid, diphenylether-4,4'-dicarboxylic acid, diphenylene-4,4'-dicarboxylic acid, diphenylmethane-4,4'-dicarboxylic acid, diphenylethane-4,4'-dicarboxylic acid, diphenylpropane-4,4'-dicarboxylic acid, paraphenylene-diacetic acid, paraphenylene-dipropionic acid, hexahydroterephthalic acid, meta- and para-aminomethylbenzoic acid, etc.

The amount of the nylon salts of these dicarboxylic acids with the diamines having the above-mentioned general formula used is 0.01–5 percent by weight, preferably 0.1–2 percent by weight.

When the nylon salt is used in an amount of less than 0.01 percent by weight, the improvement of the elastic properties of the composite filament is inappreciable, while in more than 5 percent by weight, branches and cross-linkages are formed excessively in the obtained copolyamide and gellation occurs, so that various processes such as polycondensation, spinning and drawing are difficult.

As mentioned above, by the cross-linking effect and the branching effect resulting from addition of a small amount of the polyfunctional diamine having the above-mentioned general formula in the form of nylon salt and introduction of said diamine into the main chain of the copolyamide, surprisingly the physical properties of the obtained composite filament can be improved and further the crystallinity of the copolyamide is synergistically decreased, and therefore the crimping properties, that is, curliness and crimp recovering property of the composite filament can be improved.

Another nylon salt which is one component for forming the copolyamide includes nylon salts composed of publicly known dicarboxylic acids as mentioned above and publicly known diamines as shown hereinafter.

The dicarboxylic acids composing another nylon salt may be the same as those composing the aforesaid nylon salts containing the diamines having the above-mentioned general formula.

As the diamines, use may be made of aliphatic diamines or aromatic diamines, such as, hexamethylenediamine, nonamethylenediamine, undecamethylenediamine, dodecamethylenediamine, piperazine, metaxylylenediamine, paraxylylenediamine, etc., and substantially all known diamines other than those having the above-mentioned general formula can be applied.

The nylon salts ("another nylon salt") composed of these diamines and the above-mentioned dicarboxylic acids, when introduced into the main chain of the copolyamide, are liable to disturb the crystallinity and the orientation, so that the difference in shrinkabilities is caused between two polymers to be bonded. Particularly, nylon salt composed of isophthalic acid and alkylenediamine is preferable. The amount of the "another nylon salt" used is 3–20 percent by weight, preferably 5–15 percent by weight.

The polycapramide forming components used in the production of the copolyamide include $\epsilon$-caprolactam and $\epsilon$-aminocaproic acid, and they can be used solely or in combination. The amount of polycapramide forming component used is 75–95 percent by weight, and the most preferable amount is 83–92 percent by weight. In less than 75 percent by weight, the melting point of the obtained copolyamide is considerably decreased and further the physical properties of the composite filament are deteriorated. Moreover sticking phenomena appears, so that such an amount is not preferable.

Homopolyamide and copolyamide to be used in the present invention can be easily produced by heating and copolymerizing the starting materials of said polymers under an inert gaseous atmosphere, if necessary, under increased pressure, normal pressure or reduced pressure according to a conventional publicly known process of producing polyamide.

Furthermore, the composite filament according to the present invention can be spun and drawn with a conventional apparatus, said polycapramide and copolyamide are separately melted and then extruded simultaneously through a common orifice of a publicly known spinneret for conjugate spinning and the conjugate ratio can be suitably varied within the range of 2:8 to 8:2 by weight depending upon the purpose. In this case, the conjugate form may be either a side-by-side relation or an eccentric core and sheath relation in the direction of the axis of the filament.

The obtained composite filament can be subjected to heat treatment and shrinking treatment with steam, hot water, swelling agent, heated air and the like to develop strong crimps.

Moreover the crimp developing treatment of the composite filament can be effected in any step before or after the production of yarn, fabric, knitted goods and the like, and said composite filament can be used widely.

The merit of the invention consists in the fact that even if the ratio of the polyfunctional amine component having the above-mentioned general formula to the main component in the copolyamide is very small, the copolyamide is considerably different from homopolyamide in chemical structure and crystallinity, so that polyamide composite filament having an excellent crimpability can be obtained easily and economically. Moreover, the copolyamide according to the invention consists of molecules having amino groups as their end groups and forming branch and cross-linkage between mutual main molecular chains or between main molecular chains and end groups, so that the polyamide composite filament having an excellent dyeability and elastic properties can be obtained by bonding the copolyamide with the homopolyamide.

In said filament the mutual adhesive property of both the polymers is good, so that they are not separated even after the stress, such as compression, stretching, bending, etc., is applied and if a shrinking treatment is effected again, the original crimp can be easily recovered.

The invention will be explained in detail with reference to the following examples. "Part" in the examples means part by weight.

Furthermore, the determination of the intrinsic viscosity, curliness, dyeability and crimp recovering percentage as shown below were made as follows:

1. Intrinsic viscosity

A certain amount of polymer is dissolved in such an amount of meta-cresol at 30° C. that 100 cc. of the polymer solution can be prepared.

The value substracted 1 from a ratio of time in second required for the obtained polymer solution to drop in Ostwald's viscometer to that for the solvent only is plotted on ordinate and the concentration of polymer in the solution is plotted on abscissa, and the value at a point of intersection with the axis of ordinate when extrapolated at a concentration of 0 is the intrinsic viscosity.

2. Curliness

The bundle of 40 filaments is cut in a length of 30 cm., which is dipped in boiling water for 15 minutes under various loads to develop crimps, and then dried at room temperature. The curliness is shown by the shrinking percentage of the length ($l$) of the resulting filament per the original length ($lo$) of the filament.

The curliness $= (lo-l)/(lo) \times 100 (\%)$

3. Crimp recovering percentage

The crimp developed filament bundle the length of which is ($l$) cm. is suspended with 10 g. weight and left to stand for 24 hours and then at 30 minutes after the weight is removed, the length of the bundle ($l_1$) cm. is determined. The crimp recovering percentage is calculated by the following equation:

Crimp recovering percentage (%) $=(l/l_1) \times 100$

4. Dyeability

In 100 cc. of 0.01 percent solution of acid dye, Erio Fast Yellow 3GL (manufactured by Geigy J.R. A.G.) is dipped 0.5 g. of filament, and 0.5 cc. of 1 percent acetic acid is added thereto. The assembly is heated at 95° C. for 30 minutes and then the percentage of dye absorbed by the filament shows the dyeability.

EXAMPLE 1

As one component of composite filament, polycapramide having an intrinsic viscosity of 0.99 was used and as the other component, copolyamide having an intrinsic viscosity of 0.86, which was obtained by subjecting a mixture of 85 parts of $\epsilon$-caprolactam, 9 parts of nylon salt of hexamethylenediamine with isophthalic acid, 1 part of nylon salt of 1,11-diamino-6-undecanol with terephthalic acid and 5 parts of $\epsilon$-aminocaproic acid to polycondensation by heating at 250° C. under nitrogen gas atmosphere for 9 hours, was used. Said polycapramide and said copolyamide were conjugate spun in a conjugate ratio of 1:1 (by weight) in a side-by-side relation to obtain a unitary filament, which was drawn to 4.2 times its original length at room temperature to obtain 15 deniers of composite filament.

The resulting composite filament was determined with respect to the curliness, crimp recovering percentage, strength, elongation, Young's modulus and dyeability to obtain a result as shown in the following table.

For the comparison, composite filament was produced in the same manner as described above from the polycapramide and a copolyamide, which was obtained under the same condition as described above except that nylon salt of 1,11-diamino-6-undecanol with terephthalic acid was not added. The physical properties of the composite filament are also shown in the following table.

| Physical properties | Present invention | Control |
| --- | --- | --- |
| Curliness (%) | | |
| under a load of 0.00 (mg./d.) | 85.3 | 79.5 |
| under a load of 0.20 | 79.7 | 53.0 |
| under a load of 0.60 | 54.0 | 35.3 |
| under a load of 2.00 | 25.7 | 18.3 |
| | | |
| Crimp recovering percentage (%) | | |
| under a load of 0.00 (mg./d.) | 92 | 86 |
| under a load of 0.20 | 94 | 87 |
| under a load of 0.60 | 95 | 89 |
| under a load of 2.00 | 97 | 91 |
| Strength (g./d.) | 5.2 | 4.6 |
| Elongation (%) | 24.5 | 25.2 |
| Young's modulus (g./d.) | 28.7 | 22.0 |
| Dyeability (%) | 91.5 | 68.3 |

EXAMPLE 2

As one component of composite filament, polycapramide having an intrinsic viscosity of 1.02 was used, and as the other component, a copolyamide having an intrinsic viscosity of 0.96, which was obtained by subjecting a mixture of 89.5 parts of $\epsilon$-caprolactam, 10 parts of nylon salt of metaxylylene diamine with adipic acid, and 0.5 part of nylon salt of 1,17-diamino-9-heptadecanol with isophthalic acid to copolycondensation by heating at 260° C. for 7 hours under carbon dioxide gas atmosphere, was used. Said polycapramide and said copolyamide were conjugate spun in a conjugate ratio of 1:1 (by weight) in a side-by-side relation to obtain a unitary filament, which was drawn to 4.4 times its original length at room temperature to obtain 16 deniers of composite filament. The resulting composite filament had a strength of 5.4 g./d., an elongation of 23.5 percent, a Young's modulus of 25.6 g./d. and a dyeability of 93 percent.

The crimping properties after shrunk were as follows:

| Load (mg./d.) | Curliness (%) | Crimp recovering percentage (%) |
| --- | --- | --- |
| 0.00 | 88 | 90 |
| 0.08 | 83 | 92 |
| 0.20 | 73 | 94 |
| 0.60 | 55 | 96 |
| 1.80 | 28 | 97 |

A copolyamide was prepared from 10 parts of nylon salt of metaxylylenediamine with adipic acid, and 90 parts of $\epsilon$-caprolactam without using nylon salt of 1,17-diamino-9-heptadecanol with isophthalic acid. The obtained copolyamide and the polycapramide were conjugate spun under the completely same condition as described above to obtain a composite filament having a strength of 3.9 g./d., an elongation of 23.8 percent, a Young's modulus of 18.7 g./d. and a dyeability of 72 percent.

The crimping properties were as follows:

| Load (mg./d.) | Curliness (%) | Crimp recovering percentage (%) |
| --- | --- | --- |
| 0.00 | 78 | 85 |
| 0.08 | 63 | 87 |
| 0.20 | 54 | 87 |
| 0.60 | 35 | 91 |
| 1.80 | 19 | 94 |

EXAMPLE 3

As one component, a polycapramide having an intrinsic viscosity of 0.99 was used, and as the other component, a copolyamide having an intrinsic viscosity of 1.00, which was obtained by subjecting a mixture of 5 parts of nylon salt of nonamethylenediamine with isophthalic acid, 0.5 part of nylon salt of 1,13-diamino-7-tridecanol with terephthalic acid, and 94.5 parts of $\epsilon$-caprolactam to copolycondensation by heating at 240° C. for 10 hours under nitrogen gas atmosphere, was used. Said polycapramide and said copolyamide were conjugate spun in a conjugate ratio of 1:1 in such a manner that the polycapramide was arranged in sheath portion and the copolyamide was arranged eccentrically in core portion to obtain a unitary filament, which was drawn to 4.6 times its original length at room temperature to obtain 16 deniers of composite filament. The resulting composite filament had a strength of 4.5 g./d., an elongation of 19.0 percent, a Young's modulus of 23.8 g./d. and a dyeability of 83 percent. The crimping properties were as follows:

| Load (mg./d.) | Curliness (%) | Crimp recovering percentage (%) |
| --- | --- | --- |
| 0.00 | 85 | 89 |
| 0.02 | 83 | 89 |
| 0.08 | 81 | 90 |
| 0.20 | 70 | 93 |
| 1.80 | 31 | 97 |

The composite filament obtained under the same condition as described above except that a copolyamide prepared with 5 parts of nylon salt of nonamethylenediamine with isophthalic acid and 95 parts of $\epsilon$-caprolactam was used as one component, had a strength of 3.5 g./d., an elongation of 23.7 percent, a Young's modulus of 17.2 g./d., and a dyeability of 55 percent.

Moreover the crimping properties of the filament was considerably inferior to the above-mentioned filament according to the present invention as shown in the following table.

| Load (mg./d.) | Curliness (%) | Crimp recovering percentage (%) |
| --- | --- | --- |
| 0.00 | 74 | 86 |
| 0.02 | 72 | 86 |
| 0.08 | 68 | 87 |
| 0.20 | 55 | 91 |
| 1.80 | 19 | 94 |

EXAMPLE 4

As one component of composite filament, polycapramide having an intrinsic viscosity of 0.98 was used and as the other component, copolyamide having an intrinsic viscosity of 0.90, which was obtained by subjecting a mixture of 84 parts of $\epsilon$-caprolactam, 9 parts of nylon salt of hexamethylenediamine with isophthalic acid, 2 parts of nylon salt of 1,11-diamino-6-chloroundecane with hexahydroterephthalic acid and 5 parts of $\epsilon$-aminocaproic acid to copolycondensation by heating under nitrogen gas atmosphere at 250° C. for 7 hours, was used. Said polycapramide and said copolyamide were conjugate spun in a conjugate ratio of 1:1 (by weight) in a side-by-side relation to obtain a unitary filament, which was drawn to 4.4 times its original length at room temperature to obtain 16 deniers of composite filament. The resulting composite filament had a strength of 5.0 g./d., an elongation of 23.8 percent and a Young's modulus of 23.6 g./d. and a dyeability of 90 percent. Furthermore, the crimping properties after shrunk were as follows:

| Load (mg./d.) | Curliness (%) | Crimp recovering percentage (%) |
| --- | --- | --- |
| 0.00 | 87 | 91 |
| 0.20 | 72 | 94 |
| 0.58 | 54 | 96 |
| 1.80 | 26 | 97 |

The composite filament produced under the same condition as described above except that a copolyamide obtained from 11 parts of nylon salt of hexamethylenediamine with isophthalic acid, 84 parts of ε-caprolactam and 5 parts of ε-aminocaproic acid was used as one component, had a strength of 4.4 g./d., an elongation of 26.2 percent, a Young's modulus of 20.3 g./d. and a dyeability of 72 percent. Furthermore, the crimping properties were as follows:

| Load (mg./d.) | Curliness (%) | Crimp recovering percentage (%) |
| --- | --- | --- |
| 0.00 | 79.8 | 86 |
| 0.20 | 53.4 | 87 |
| 0.58 | 33.0 | 89 |
| 1.80 | 15.8 | 92 |

EXAMPLE 5

As one component of composite filament, polycapramide having an intrinsic viscosity of 0.97 was used and as the other component, copolyamide having an intrinsic viscosity of 0.95, which was obtained by subjecting a mixture of 86 parts of ε-caprolactam, 8 parts of nylon salt of hexamethylenediamine with terephthalic acid, 1 part of nylon salt of 1,9-diamino-5-bromononane with isophthalic acid and 5 parts of ε-aminocaproic acid to copolycondensation by heating under nitrogen gas atmosphere at 270° C. under an atmospheric pressure for 7 hours, was used. Said polycapramide and said copolyamide were conjugate spun in a conjugate ratio of 1:1 (by weight) in a side-by-side relation to obtain a unitary filament, which was drawn to 4.4 times its original length at room temperature to obtain 15 deniers of composite filament. The resulting composite filament had a strength of 5.1 g./d., an elongation of 23.8 percent and a Young's modulus of 22.0 g./d. and a dyeability of 90 percent. Furthermore, load value in 50 percent of curliness was 0.56 mg./d. and the crimp recovering percentage in this case was 97 percent.

The composite filament obtained under the same condition as described above except that a copolyamide prepared without using the nylon salt of 1,9-diamino-5-bromononane with isophthalic acid was used as one component, had a strength of 4.2 g./d., an elongation of 25.3 percent, a Young's modulus of 18.0 g./d. and a dyeability of 70 percent. Moreover, the load value in 50 percent of curliness was only 0.19 mg./d. and the crimp recovering percentage in this case was 90 percent.

EXAMPLE 6

As one component of the composite filament, polycapramide having an intrinsic viscosity of 1.02 was used and as the other component, copolyamide having an intrinsic viscosity of 0.98, which was obtained by subjecting a mixture of 89.5 parts of ε-caprolactam, 10 parts of nylon salt of undecamethylenediamine with terephthalic acid and 0.5 part of nylon salt of 1,11-diamino-6-undecanone with isophthalic acid to copolycondensation by heating under the same condition as described in example 1, was used. Said polycapramide and said copolyamide were conjugate spun in a conjugate ratio of 1:1 (by weight) in a side-by-side relation to obtain a unitary filament, which was drawn to 4.4 times its original length at room temperature to obtain 15 deniers of composite filament. Said composite filament has a strength of 5.1 g./d., an elongation of 25.3 percent, a Young's modulus of 26.4 g./d. and a dyeability of 88 percent. The crimping properties after further shrunk were as follows:

| Load (mg./d.) | Curliness (%) | Crimp recovering percentage (%) |
| --- | --- | --- |
| 0.00 | 88 | 90 |
| 0.08 | 84 | 92 |
| 0.20 | 73 | 94 |
| 0.60 | 54 | 95 |
| 1.80 | 29 | 97 |

The composite filament produced under the same condition as described above except that for preparing the copolyamide component 10 parts of nylon salt of undecamethylenediamine with terephthalic acid and 90 parts of ε-caprolactam were used without using the nylon salt of 1,11-diamino-6-undecanone with isophthalic acid, had a strength of 4.2 g./d., an elongation of 23.6 percent, a Young's modulus of 19.5 g./d. and a dyeability of 75 percent.

The crimping properties were as follows:

| Load (mg./d.) | Curliness (%) | Crimp recovering percentage (%) |
| --- | --- | --- |
| 0.00 | 77 | 85 |
| 0.08 | 63 | 87 |
| 0.20 | 52 | 88 |
| 0.60 | 34 | 91 |
| 1.80 | 20 | 93 |

EXAMPLE 7

As one component of composite filament, polycapramide having an intrinsic viscosity of 0.95 was used and as the other component, copolyamide having an intrinsic viscosity of 0.98, which was obtained by subjecting a mixture of 86 parts of ε-caprolactam, 8 parts of nylon salt of hexamethylenediamine with isophthalic acid, 1 part of nylon salt of 1,13-diamino-7-tridecanone with terephthalic acid and 5 parts of ε-aminocaproic acid to polycondensation by heating under the same condition as described in example 1, was used. Said polycapramide and said copolyamide were conjugate spun in a conjugate ratio of 1:1 (by weight) in a side-by-side relation to obtain a unitary filament, which was drawn to 4.2 times its original length at room temperature to obtain 15 deniers of composite filament. Said composite filament had a strength of 4.8 g./d., an elongation of 25.6 percent, a Young's modulus of 21.6 g./d. and a dyeability of 92 percent. Furthermore, the load value in 50 percent of curliness was 0.54 mg./d. and the crimp recovering percentage in this case was 96 percent.

The composite filament obtained under the same condition as described above except that for preparing the copolyamide component the nylon salt of 1,13-diamino-7-tridecanone with terephthalic acid as not used, had a strength of 4.3 g./d., an elongation of 26.0 percent, a Young's modulus of 16.2 g./d. and a dyeability of 71 percent. The load value in 50 percent of curliness was 0.22 mg./d. and the crimp recovering percentage was only 90 percent.

EXAMPLE 8

As one component of composite filament, polycapramide having an intrinsic viscosity of 1.05 was used and as the other component, copolyamide having an intrinsic viscosity of 0.98 which was obtained by subjecting a mixture of 89.5 parts of ε-caprolactam, 10 parts of nylon salt of metaxylylenediamine with sebacic acid and 0.5 part of 1,9-diamino-5-nonanone with isophthalic acid to copolycondensation by heating under carbon dioxide gas atmosphere under an atmospheric pressure at 260° C. for 10 hours, was used. Said polycapramide and said copolyamide were conjugate spun in a conjugate ratio of 2:1 (by weight) to obtain a unitary filament, which was drawn to 4.2 times its original length at room temperature to obtain 15 deniers of composite filament. Said composite filament had a strength of 4.9 g./d., an elongation of 25.8 percent, a Young's modulus of 22.7 g./d., and a dyeability of 83 percent. The load value in 50 percent of curliness was 0.57 mg./d. and the crimp recovering percentage in this case was 94 percent.

The composite filament obtained under the same condition as described above except that for preparing the copolyamide component nylon salt of 1,9-diamino-5-nonanone with isophthalic acid was not used, had a strength of 4.0 g./d., an elongation of 27.2 percent, a Young's modulus of 17.5 g./d. and a dyeability of 68 percent. The load value in 50 percent of curliness was only 0.18 mg./d. and the crimp recovering percentage in this case was 88 percent.

What is claimed is:

1. A polyamide composite filament having high crimpability in which two different components of fiber-forming thermoplastic synthetic linear polymers are arranged and bonded eccentrically as distinct filamentary components along the length of the filament, wherein the improvement comprises one of said components being polycaproamide and the other of said components being a polycondensation product of a mixture of 0.01 to 5 percent by weight of a nylon salt consisting of a dicarboxylic acid and a polyfunctional diamine having the general formula:

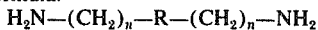

wherein R is >CHCl or >CHBr and $n$ is 3 to 11, 3 to 20 percent by weight of another nylon salt and 75 to 95 percent by weight of a polycaproamide forming component.

2. A filament according to claim 1, wherein the amount of said another nylon salt is 5–15 percent by weight, and the amount of said polycapramide forming component is 83–92 percent by weight.

3. A filament according to claim 1, wherein the amount of said nylon salt containing the polyfunctional diamine is 0.1–2 percent by weight.

4. A filament as claimed in claim 1 wherein said polyfunctional diamine is selected from the group consisting of 1,7-diamino-4-chloroheptane, 1,9-diamino-5-chlorononane, 1,11-diamino-6-chloroundecane, 1,13-diamino-7-chlorotridecane, 1,15-diamino-8-chloropentadecane, 1,17-diamino-9-chloroheptadecane, 1,19-diamino-10-chlorononadecane, 1,21-diamino-11-heneicosane, 1,23-diamino-12-chlorotricosanone, 1,11-diamino-6-bromoundecane, 1,13-diamino-7-bromotridecane.

5. A filament according to claim 1, wherein the dicarboxylic acid is selected from the group consisting of glutaric acid, adipic acid, pimelic acid, suberic acid, azelaic acid, sebacic acid, terephthalic acid, isophthalic acid, diphenylether-4,4'-dicarboxylic acid, diphenylene-4,4'-dicarboxylic acid, diphenylmethane-4,4'-dicarboxylic acid diphenylpropane-4,4'-dicarboxylic acid, paraphenylene-diacetic acid, paraphenylene-dipropionic acid, hexahydroterephthalic acid, diphenylethane-4,4'-dicarboxylic acid and meta- and para-aminomethylbenzoic acid.

6. A filament according to claim 1, wherein the diamine in said another nylon salts is selected from the group consisting of aliphatic diamines and aromatic diamines other than said polyfunctional diamines.

7. A filament according to claim 6, wherein said aliphatic diamine is selected from the group consisting of hexamethylenediamine, nonamethylenediamine, undecamethylenediamine, dodecamethylenediamine, and piperazine.

8. A filament according to claim 6, wherein said aromatic diamine is selected from the group consisting of metaxylylenediamine and paraxylylenediamine.

9. A filament according to claim 1 wherein said another nylon salt consists of an alkylenediamine and isophthalic acid.

10. A filament according to claim 1, wherein said polycapramide forming component is selected from the group consisting of ε-caprolactam and ε-aminocaproic acid.

11. A filament according to claim 1, wherein said two components are bonded in the conjugate ratio ranging 2:8–8:2 by weight.

12. A filament according to claim 1, wherein said two components are bonded in a side-by-side relation.

13. A filament according to claim 1, wherein said two components are bonded in an eccentric core and sheath relation.

* * * * *